United States Patent [19]

Bergeson et al.

[11] Patent Number: 4,637,950

[45] Date of Patent: Jan. 20, 1987

[54] DELAMINATION-RESISTANT CELLULAR RETROREFLECTIVE SHEETING

[75] Inventors: David L. Bergeson, Mendota Heights; Lee A. Pavelka, Cottage Grove; Barbara A. Mielke, Inver Grove Heights, all of Minn.

[73] Assignee: Minnesota Mining and Manufacturing Company, St. Paul, Minn.

[21] Appl. No.: 729,369

[22] Filed: May 1, 1985

[51] Int. Cl.[4] .......................... B32B 3/28; G02B 5/122

[52] U.S. Cl. .................................... 428/168; 428/325; 428/172; 428/910; 428/913; 350/102; 350/103; 350/105

[58] Field of Search ............... 428/325, 168, 172, 910, 428/913; 350/102–105

[56] References Cited

U.S. PATENT DOCUMENTS

| | | | |
|---|---|---|---|
| 3,190,178 | 6/1965 | McKenzie | 88/82 |
| 3,562,235 | 2/1971 | Ryan | 260/885 |
| 3,700,305 | 10/1972 | Bingham | 350/105 |
| 3,793,402 | 2/1974 | Owens | 260/876 R |
| 3,808,180 | 4/1974 | Owens | 260/885 |
| 4,025,159 | 5/1977 | McGrath | 350/105 |
| 4,075,049 | 2/1978 | Wood | 156/220 |
| 4,173,600 | 11/1979 | Kishida et al. | 525/76 |

FOREIGN PATENT DOCUMENTS 1323506 7/1973 United Kingdom .

OTHER PUBLICATIONS

European Application 84.306,198.7-2205, Published Apr. 17, 1985, Pub. No. 0137736.

*Primary Examiner*—George F. Lesmes
*Assistant Examiner*—S. A. Gibson
*Attorney, Agent, or Firm*—Donald M. Sell; James A. Smith; Roger R. Tamte

[57] ABSTRACT

Cellular retroreflective sheeting, which comprises a base sheet of retroreflective elements and a polymeric cover film disposed in space relation from the base sheet by a network of narrow intersecting bonds that form hermetically sealed cells. The cover layer comprises a continuous polymeric phase and discontinuous polymeric phase and is biaxially oriented such that the discontinuous polymeric phase forms minute disks distributed throughout the film.

23 Claims, 6 Drawing Figures

14 10 13 14 13

DELAMINATION-RESISTANT CELLULAR RETROREFLECTIVE SHEETING

BACKGROUND OF INVENTION

The present invention is directed to improvement in cellular retroreflective sheeting of the type first taught in U.S. Pat. No. 3,190,178. Such sheeting comprises a base sheet in which a layer of transparent microspheres is partially embedded and partially exposed, a transparent cover film disposed in spaced relation above the layer of microspheres, and a network of narrow intersecting bonds that adhere the base sheet and cover film together and divide the space between the base sheet and cover film into hermetically sealed cells. A continuing effort with such sheeting is to increase the resistance of the sheeting to delamination of the cover film from the base sheet. Upon such delamination, moisture can enter the cells and cover the exposed faces of the microspheres, whereupon the focusing capacity of the microspheres is reduced and destructive corrosion of a specularly reflective layer behind the microspheres is promoted.

Significant increases in the bond strength between the cover film and base sheet were achieved by the invention taught in U.S. Pat. No. 4,025,159, in which the bonds are cured in situ after being thermoformed into place. Commercial sheeting using such bonds has displaced previous versions and won wide acceptance.

DISCLOSURE OF INVENTION

We have now made a cellular retroreflective sheeting that offers even greater resistance to delamination of the cover film from the base sheet. The new cellular retroreflective sheeting is similar to previous cellular retroreflective sheeting in that it comprises (1) a base sheet having a layer of retroreflective elements disposed over one of its surfaces; (2) a cover film disposed in spaced relation from the layer of retroreflective elements; and (3) a network of narrow intersecting bonds extending between the base sheet and cover film to adhere them together and form a plurality of cells within which retroreflective elements are hermetically sealed. As taught in U.S. Pat. No. 4,025,159, the retroreflective elements can be transparent microspheres, in which case the cover film is at the front of the sheeting; or the retroreflective elements may be cube-corner retroreflective elements, in which case the cover film is at the back of the sheeting.

The new sheeting is different from previous sheeting in that the cover film comprises a continuous polymeric phase and a particle-like discontinuous polymeric phase dispersed throughout the continuous phase, and the film is biaxially oriented such that the discontinuous polymeric phase is in the form of minute disks distributed uniformly throughout the film. Such a structure can be obtained with a multiphase composite interpolymer, preferably an acrylic-based interpolymer in which the discontinuous phase comprises a crosslinked elastomeric polymeric material, and the continuous phase comprises a more rigid thermoplastic polymeric material polymerized in the presence of the elastomeric phase.

Sheeting of the invention is little affected by forces that tend to remove the cover film from the base sheet. Under the influence of such forces, the cover film is generally removed only at the edge of the sheeting, e.g., from the edge row of cells, but no further. Most of the sheeting remains intact and ready for continued utility.

Without committing ourselves to a specific reason for this improvement, it is thought that the internal strength of the disk-containing film is less than the strength of the bond between the cover film and base sheet. More specifically, when the cover film is under stress, a pattern of internal stresses can develop at the edge of the discontinuous-phase disks in such concentration as to cause the film to rupture. When sheeting of the invention is undergoing forces tending to delaminate the cover film from the base sheet, the greatest stresses occur at the point at which the bond around a cell is adhered to the cover film. These stresses are concentrated internally around the discontinuous-phase disks, and the film can tear or rupture along the line where the film is connected to the bonds.

Interestingly, although others have contemplated use of multiphase cover films in cellular retroreflective sheeting (see U.S Pat. No. 4,075,049, column 5, lines 27–36), they have not recognized the advantages that arise for cellular retroreflective sheeting when those films are biaxially oriented to cause formation of the discontinuous phase particles into flattened disks. In the flattened disk form, films are obtained which provide resistance to delamination never before achieved in a cellular retroreflective sheeting.

DETAILED DESCRIPTION

Figure 1:
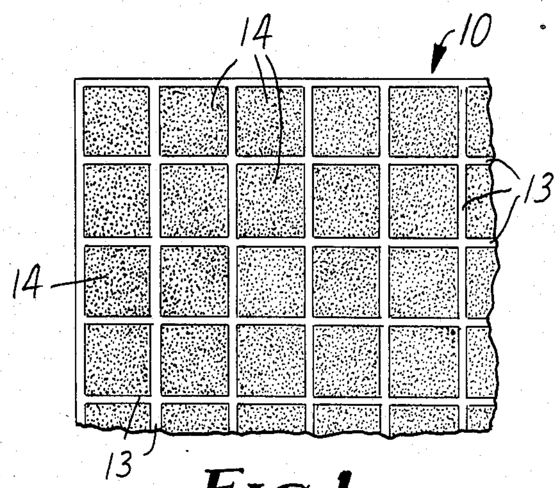
FIG. 1 is a top view of a portion of a representative microsphere-based cellular retroreflective sheeting of the invention.
Figure 3:
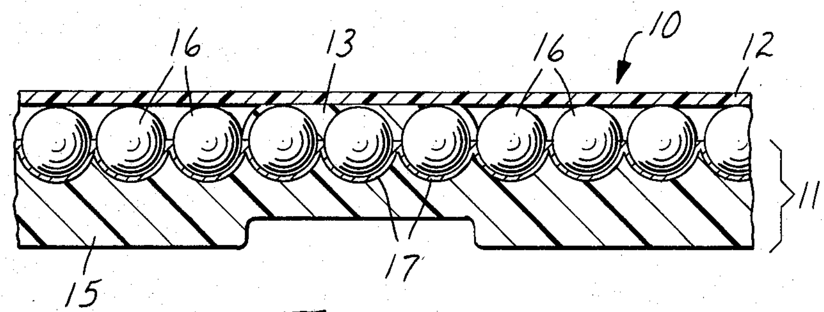
FIG. 3 is a cross-sectional view of a portion of completed microsphere-based cellular retroreflective sheeting made using the apparatus and sheet components shown in FIG. 2.

As shown in FIGS. 1 and 3, a representative retroreflective sheeting 10 of the invention comprises a base sheet 11, a transparent cover film or cover sheet 12, and narrow intersecting bonds 13 which attach the base sheet and cover film together and separate the space between them into hermetically sealed cells or pockets 14.

Figure 2:
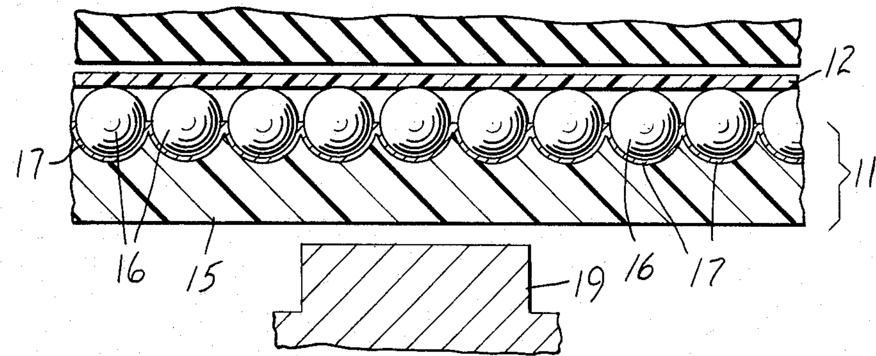
FIG. 2 is an enlarged schematic sectional view of apparatus and sheet components in the course of manufacture of a representative microsphere-based cellular retroreflective sheeting of the invention.
Figure 4:
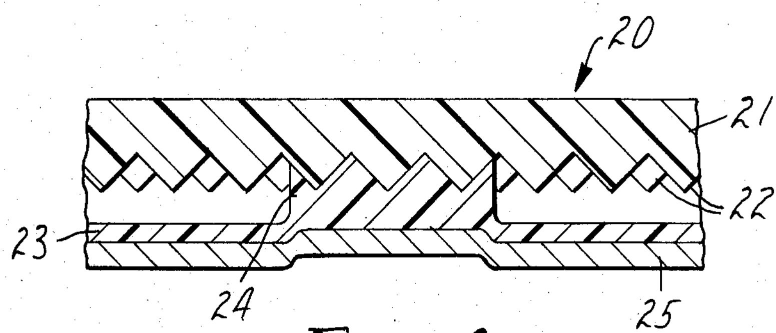
FIG. 4 is a cross-sectional view of a representative cube-corner cellular reflective sheeting of the invention.

As shown in FIGS. 2 and 3, in a representative microsphere-based sheeting of the invention, the base sheet 11 typically includes a support layer 15 of binder material, a monolayer of transparent microspheres 16, which are partially embedded in the support layer and partially exposed above the support layer, and a specular light-reflecting layer 17 underlying and in optical connection with the embedded surface of the microspheres, such as vapor-deposited aluminum or such as dielectric material as described in Bingham, U.S. Pat. No. 3,700,305. In a variation from the illustrated structure, such as illustrated by FIG. 4 of U.S. Pat. No. 4,025,159, an additional layer of binder material is included, e.g., between the exposed portions of the microspheres, to assist in forming bonds to the cover film.

A base sheet 11 as illustrated in FIG. 2 can be prepared by procedures well known in the art, such as described for example in U.S. Pat. No. 3,190,178. An assembly of cover film 12 and base sheet 11 may then be laminated together, as also described in U.S. Pat. No. 3,190,178, by inserting the assembly between a pair of heated platens. One platen is an embossing platen having a pattern of raised ridges (represented by 19 in FIG. 2); and the ridges press against the base sheet 11 to deform the support layer 15 into the configuration shown in FIG. 3. The support layer is heated and pressed sufficiently so that it floods the microspheres in the area pressed and contacts the cover film 12. The pattern of ridges on the embossing platen is such as to form the network of narrow bonds illustrated in FIG. 1. If desired, a support film may be laminated to the support layer prior to, or during, the embossing operation to separate the embossing platen from the support layer. In addition, the sheeting may include a layer of adhesive and a release liner.

Following the embossing operation, the cover film 12 continues to be in spaced relation with the microspheres 16. Very little spacing, as thin as a monomolecular layer of air, for example, provides the necessary air interface to obtain desired optical effects. Following the embossing operation, the sheet material has the desired hermetic cells covered by a cover film, and surrounded on all borders by a polymer-based bond.

The sheet material may be complete at that point, but in one preferred construction, the embossed sheeting is exposed to a predetermined level of radiation as described in U.S. Pat. No. 4,025,159, which causes the binder material 15 to cure to a relatively infusible and insoluble condition. Rapidly acting forms of radiation, i.e., requiring application for less than 5 minutes and preferably for less than 5 seconds, are strongly preferred for reasons of economy as well as to minimize handling of the product while the bonds are at less than finished strength. Electron-beam radiation is especially desired because of its ability to penetrate even heavily pigmented coatings, its speed and efficient use of applied energy, and its ease of control. Other useful forms of radiation include ultraviolet light; nuclear radiation; microwave radiation; and heat, though at present heat radiation requires unpreferred long times of application.

Binder materials useful in forming thermoformed bonds are typically room-temperature solids that will soften to a flowable state when heated to temperatures between about 25° and 150° C. Under pressure of an embossing platen the binder material flows sufficiently to wet the cover film and to flood the microspheres in the area pressed, but it does not flow significantly into areas that are not pressed, and thereby leaves the described cell or pocket of exposed microspheres. Further, once the heat and pressure are removed, the binder material will hold its thermoformed shape.

If the binder material is then to be cured, e.g., by electron-beam radiation, it will include one or more reactive ingredients, e.g., ingredients that are activated in the presence of electron-beam radiation (as by formation of free radicals through loss or transfer of hydrogen atoms or decomposition of initiator molecules). See U.S. Pat. No. 4,025,159, which is incorporated herein by reference.

Acrylic-based ingredients are especially useful binder materials ("acrylic-based ingredients" as used herein means acrylic or methacrylic acid or ingredients obtained from acrylic or methacrylic acid). Typical useful acrylic-based monomers are polyethylene glycol diacrylates; 1,6-hexanediol diacrylate; hydroxymethyl diacetone acrylamide; and 2-cyanoethyl acrylate; and typical acrylic-based polymeric materials are acrylate or methacrylate polymers or copolymers. Other useful binder materials are represented by dialkyl glycol carbonate; and saturated or unsaturated polyester or polyurethane resins. The binder materials are chosen so as to have good adhesion to the cover film of the product.

The support layer of binder material in retroreflective sheeting as shown in FIGS. 1-4 should generally be at least about as thick as the average diameter of the microspheres employed, and may approach two or three times the diameter of the microspheres employed.

Although displacement of binder material from a support layer is the preferred way to form bonds, because of the fewer steps in such an operation, minimization of interfaces within the sheeting, and controlled shaping of bonds into neat narrow lines, the bonding material may also be introduced into the sheeting separately from the support layer, as a separate sheet preformed in an open-mesh pattern, for example. Such a separately introduced bonding material is then adhered between the cover sheet and base sheet, e.g., by thermoforming it into contact with the two sheets, and preferably following the thermoforming by a curing as described. The thermoforming may require that only the edge-portions of the preformed structure flow into sealing contact with the substrate against which it is pressed. Further, rather than displacing material from a base sheet or cover film, a bond structure may be formed prior to assembly of the cover film and base sheet, as by molding such bond structure at the time of molding a cube-corner structure. During assembly of the base sheet and cover film, the preformed bond structure is then adhered to the cover film or base sheet, e.g., by thermoforming of the bond structure or of the surface it engages.

A variety of multiphase polymers are available for making cover films for sheeting of the invention. Preferred polymers are made by multiphase composite interpolymerization such as taught, for example, in U.S. Pat. Nos. 3,793,402; 3,808,180; 3,562,235; 4,173,600; or British Pat. No. 1,323,506. These patents teach interpolymers made from a variety of monomeric ingredients, but for the present invention the preferred ingredients for transparency and weatherability are primarily acrylate-based and/or methacrylate-based ingredients. Other useful monomeric ingredients are acrylonitrile, styrene, butadiene, ethylene-propylene, and vinyl monomers.

In the first step or first stage of the preferred processes, a generally rubbery or elastomeric, uniformly crosslinked copolymer is formed by emulsion copolymerizing an alkyl or aralkyl ester of acrylic acid with a small amount of a crosslinking monomer (by elastomeric is meant a material that rapidly returns substantially to its original dimensions when stretched at room temperature and the stretching force released). The copolymerization is conducted under such reaction conditions as to form a first-stage latex of medium to large particle size, in the range of about 40 to 200 nanometers in radius.

The alkyl group in the alkyl or aralkyl ester of acrylic acid in one preferred composition generally contains 2 to 8 carbon atoms. The alkyl group can be a straight or branched chain. Part of the alkyl or aralkyl acrylate up to about 20 percent by weight can be replaced with a monoethylenically unsaturated monomer that is non-crosslinking with respect to the alkyl acrylate and has a terminal group $H_2C{=}CH$— intrapolymerizable therewith. Examples of such vinylidene monomers are vinylidene chloride, vinyl chloride, acrylonitrile, vinyl esters, alkyl methacrylic esters, styrene, etc. A crosslinking bi- or polyfunctional monomer is used, e.g., in an amount of 0.05 to 5 weight-percent, for crosslinking the alkyl or aralkyl acrylate monomer, and preferably is an alkylene glycol diacrylate such as ethylene glycol diacrylate; 1,3,-butylene glycol diacrylate; or propylene glycol diacrylate.

As a second step or second stage, a mixture of a lower alkyl or aralkyl ester of methacrylic acid, such as methylmethacrylate, and an alkyl or aralkyl ester of acrylic acid is polymerized in the presence of the preformed latex under conditions such that the polymerized chains become attached to and/or intimately associated with the crosslinked polymer chains produced in the first stage. During the second stage, essentially no new, or distinct particles are produced, but instead the newly polymerized material builds on the previous particles. The first-stage polymeric particles should not agglomerate with one another during the second-stage polymerization, which is generally achieved through crosslinking of the first-stage polymeric material.

Further polymerization steps may be conducted with varying compositions, e.g., different proportions of the mixtures of ingredients, generally producing a more hard or rigid thermoplastic material. For example, in the subsequent stages, there may be a gradually diminishing amount of the alkyl or aralkyl acrylate and a gradually increasing amount of lower alkyl or aralkyl methacrylate, e.g., $C_1$ to $C_4$ alkyl methacrylate. In the last or hard stage there may be present 0 to 20 percent by weight alkyl acrylate and 80 to 100 percent by weight lower alkyl methacrylate.

Eventually solid, particulate, core-shell type of thermoplastic polymeric product is isolated from the emulsion by evaporation, or by suitable coagulation washing. Films of such polymeric powders may be prepared by known techniques. Generally, the films are prepared by elevated-temperature extrusion processes in which the powder is fused together, with the later-formed thermoplastic phases of the powder becoming a continuous matrix or continuous phase in which the initially-formed core portion is dispersed as a discontinuous phase. Although there is a gradual gradation of composition in the powdered polymerization product, the elastomeric phase is distinguishable under microscopic examination of the film as a separate phase in the form of particles dispersed uniformly through the film.

Figure 5:
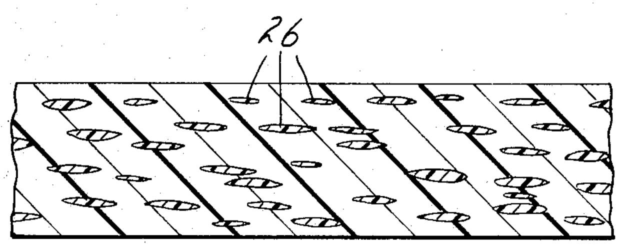
FIGS. 5 and 6 are greatly enlarged cross-sectional views through a representative cover film used in retroreflective sheeting of the invention, FIG. 5 being taken transverse to the film and FIG. 6 being taken in the plane of the film.

As extruded, there may be a slight elongation of the discontinuous-phase particles in the direction the film was extruded, because of distortions arising during extrusion. However, during biaxial orientation of the film, the particles undergo a more substantial lengthening in both the length and width directions of the film, and a corresponding flattening of the particles into a disk shape, i.e., a somewhat circular shape having a greater diameter than thickness (see FIGS. 5 and 6 in which the disks are identified with the numeral 26). This lengthening is assisted because the discontinuous-phase particles, or core portion of the interpolymer, are generally softer than the continuous phase portion of the polymer; i.e., the discontinuous-phase portion of the polymer deforms under pressure more readily than the continuous-phase portion of the polymer, at least at the temperature at which the film is oriented, and typically also at room temperature. The discontinuous-phase particles preferably have a glass transition temperature of −10° C. or below, and their glass transition temperature is preferably at least 80° C. less than that of the continuous-phase portion of the polymer. Any amount of biaxial orientation of a film of discontinuous and continuous phases as described provides improved resistance to delamination of the cover sheet. However, best results are achieved when the orientation is sufficient to cause an average length to thickness ratio in the disks of at least 2.5 to 1, and most preferably, at least 4 to 1. Orientation is obtained in standard orienting equipment using a length orienter and a tentering machine. Generally, the extruded material is stretched or oriented at least 150 percent in both the machine and transverse directions, and the temperature of stretching is generally at least 20° C. higher than the glass transition temperature of the continuous-phase polymeric material of the film. Higher stretch temperatures can reduce cover film transparency, depending on a particular material; for example, for an acrylic interpolymer with a 100° C. continuous-phase glass transition temperature, a tenter temperature of about 125° C. and a stretch ratio of 2:1 has achieved desired results.

Brittleness does not seem to be a factor in the improved results obtained with the sheeting, because in fact, the sheeting tends to have greater overall flexibility and toughness after the biaxial orientation than it does before. For example, elongation-to-break values are generally increased by the biaxial orientation, with tensile strengths remaining substantially constant. Despite such flexibility and maintained tensile strength, however, the previously noted rupture of the film occurs along the line of its bond to the base sheet and there is only limited removal of the film from the sheeting.

The size of the discontinuous-phase disks can vary. Disks smaller than about 200 nanometers in diameter offer superior transparency for the cover film. Better transparency is also achieved by causing the discontinuous-phase and continuous-phase polymers to have similar indices of refraction.

The discontinuous phase generally comprises at least about five percent of the film and preferably comprises at least eight percent of the film. Such amounts can exist in commercially available multiphase interpolymers, or may be obtained by blending such interpolymers with other polymeric materials. In the latter case, the polymer can be selected to be compatible and blendable with (i.e., soluble in) the continuous phase of the multiphase interpolymer, so that in a finished cover film the polymer and continuous phase blend to form a single phase. The film should be highly transparent to visible light, preferably allowing at least 80 percent light transmittance (ASTM D1746) for the sheet to function as a high-performance retroreflector. The cover films are typically between about 1 and 5 mils in thickness, though they may have other thicknesses also depending on a desired balance of properties such as transparency, strength and handleability.

The microspheres in retroreflective sheeting of the invention are generally less than about 200 micrometers in diameter and greater than 10 or 15 micrometers in diameter and preferably are between about 25 and 80 micrometers in diameter. The microspheres preferably have an index of refraction of 1.91, though they may have other indices for other constructions of sheeting, such as sheeting that includes a transparent space coat between the microspheres and specular reflective means.

Figure 6:
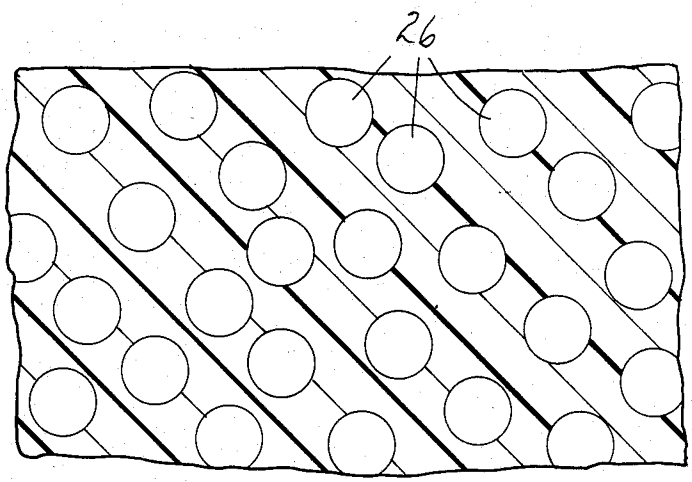

The representative cube-corner retroreflective sheeting 20 shown in FIG. 6 comprises a transparent base sheet 21, on the rear surface of which are molded cube-corner retroreflective elements 22. A preferred form of such base sheet, in which the cube-corner elements are inclined to increase the angularity of the existing, i.e., the range of angles at which light can be directed at the sheeting and still be reflected, is taught in European application No. 84,306,198.7-2205, published Apr. 17, 1985 under publication number 0137736.

The cube-corner elements 22 molded into the back of the transparent base sheet 21 require protection from moisture for best results, and a cover film 23 sealed to the sheet by a network of bonds 24 provides such protection. The cover film is adhered to the cube-corner surface by a lamination procedure similar to that described above. An adhesive layer 25 may be carried on the bottom of the cover film.

The invention will be further illustrated by the following examples.

EXAMPLES 1-6

A series of transparent, biaxially-oriented films were prepared from thermoplastic acrylic-based polymers described in Table I and from blends of those polymers. Polymer A in Table I is a molding grade resin consisting of a single phase copolymer of methyl methacrylate and ethyl acrylate. This resin is typical of the rigid, glassy resins used to make the cover films of prior art cellular reflective sheeting. Polymers (B) through (E) are multiphase interpolymers wherein discrete elastomeric particles are dispersed in a rigid acrylic matrix. These materials are commercially available in pellet form. Various additives, such as stabilizers or lubricants, may be included in these commercial polymers besides the listed principal ingredients; see U.S. Pat. No. 3,793,402, columns 11 and 12.

Table II shows the particular compositions of films prepared. In the case of Examples 1 and 2, pellets of polymers A and D were dry-blended in the specified weight ratios prior to film formation.

Each composition was dried and then melt-processed in a screw extruder feeding a 500° F. (260° C.) sheet die. Biaxially-oriented 3-mil-thick (75-micrometer-thick) films were prepared on conventional tenter frame equipment by forming a 12-to-15-mil-thick (300 to 375 micrometer-thick) extruded sheet and then sequentially stretching the sheet in the length or machine and transverse directions to achieve a stretch ratio of 2.0 in each direction.

Test samples of cellular reflective sheeting were prepared by first constructing a microsphere-based base sheet according to the method taught in U.S. Pat. No. 4,025,159. The binder layer used was a radiation-curable, acrylic coating composition prepared from a mixture of the following components:

| | Parts by Weight |
|---|---|
| Terpolymer of 52.5% methylmethacrylate, 43% ethyl acrylate, and 4.5% isooctylacrylate dissolved in xylene to give a 38% solids solution | 176.3 |
| Tetraethylene glycol diacrylate | 14.0 |
| Rutile titanium dioxide | 18.0 |
| Stearic acid | 1.0 |
| Xylene | 40.7 |

Glass microspheres (50-80 micrometer diameter, 1.91 index of refraction) were partially embedded in a 40-micrometer-thick polyethylene coating on an approximately 125-micrometer-thick paper web, and the resulting beaded surface was vapor-coated with aluminum.

This solution of binder material was knife-coated at 12 mils (0.3 millimeter) over the aluminum-coated beaded surface, the web dried in a forced-air oven to remove solvent, and the web then laminated to a thin protective film of polyethylene terephthalate (PET). Next, the polyethylene-coated paper was carefully stripped away, forming an "exposed-lens composite" or base sheet of vapor-coated glass microspheres partially embedded in the uncured binder layer.

Samples of the biaxially-oriented, transparent cover films listed in Table II were overlaid on samples of the just-described base sheets, and the films were heat-sealed to the base sheet in a network-like pattern by passing assemblies of the films and base sheets through a pressurized nip roller assembly where one of the rollers is a heated embossing roller. The sealing speed was about 12 feet (3.6 meters)/minute. The embossing roller was heated to about 300° F. (150° C.) to induce the uncured binder material to flow under pressure and contact the cover film in the areas corresponding to the pattern of raised ridges on the embossing roll. The sealed areas were roughly 20 mils (500 micrometers) wide. After this seal pattern was formed, the sheeting samples were irradiated through the backside with a 200 kilovolt electron beam to achieve a dosage of 2.0 MRAD. The PET film was then removed from each sample.

The cured samples were cut into 1-inch-wide (2.5 centimeter-wide) strips and applied to adhesive-coated aluminum panels for testing the resistance of the samples to delamination of the cover film. The adhesive on the panels was a 150-micrometer-thick layer of rubber-based adhesive (e.g., 3M "Scotch-Grip" Brand #847). A sharp razor blade was then used to attempt to manually separate the cover film from the sealed binder layer on one end of the sample strip. Cover film removal in this manner was much more difficult on samples of the invention (Examples 1-6) than for Comparative Example Nos. 1 and 2. The cover film on Comparative Example Nos. 1 and 2 could be separated sufficiently with the razor blade to run a 90° peel test on an Instron Tensile Tester at a 12.5-centimeter/minute rate, and in that test the entire cover film could be removed in one piece at peel values of about 3 pound/inch (0.5 kilogram/centimeter). On samples of the invention, large pieces of cover films could not be removed by peeling because of film tearing along the sealed areas. Only pieces about the size of a cell or row of cells were removable. Some residue of the bond material appeared to be present on the bits of cover film removed from the samples of sheeting of the invention, possibly through better penetration of the bond material into the film than into the cover film in the comparative examples.

EXAMPLES 7-11

Samples of cellular reflective sheeting as described in Examples 1-6, in 8-inch-by-10-inch (20 by 25 centimeters) sizes, were applied to a large 0.25-millimeter-thick aluminum panel using a heat-activated adhesive and commercial heat lamp vacuum applicator. To simulate the harsh environment a retroreflective vehicle marking would experience in a commercial truck wash, one 20-centimeter edge of each rectangular sample was exposed for 30 seconds to a high pressure water spray from a nozzle held a distance of 5 centimeters from the exposed edge. The pressure was 1,500 psi ($1\times10^7$ Newtons/square meter). Table III gives the estimated area of cover film removed. Only the partial cells along the trimmed edge were removed on Examples 7-11.

EXAMPLE 12

Example 1 was repeated using the following binder composition:

| | Parts By Weight |
|---|---|
| 50/50 copolymer of n-butyl and isobutyl methacrylate dissolved in xylene at 45% solids (Elvacite 2046 supplied by DuPont) | 200 |
| Rutile titanium dioxide pigment | 20 |
| Diphenol adduct of 4,4' diphenyl methane diisocyanate | 8 |
| Polyoxyethylene polyamine having a molecular weight of about 600 (Jeffamine ED 600 supplied by Jefferson Chemical Company, Inc.) | 12 |
| Stearic Acid | 1 |

TABLE I

| | ACRYLIC POLYMER | | | | | | |
|---|---|---|---|---|---|---|---|
| | MAJOR COMPONENTS (MOL %) | | | | | MELT INDEX[1] | ESTIMATED AMOUNT OF DISCONTINUOUS PHASE |
| | MMA | EA | BA | STY | BD | (g/10 MIN) | PHASE |
| A. Unmodified Glassy Polymethylmethacrylate Resin (Tg = 100° C.) ("Lucite" 147 from DuPont | 95 | 5 | — | — | — | 3.0 | 0 |
| B. Multiphase Interpolymer ("Korad" D from Polymer Extruded Products) | 76 | — | 24 | — | — | | 50 |
| C. Multiphase Interpolymer ("Plexiglas" MI-7 from Rohm and Haas) | 90 | 10 | — | — | — | 3.0 | 21 |
| D. Multiphase Interpolymer ("Plexiglas" DR100 from Rohm and Haas) | 88 | 4 | 8 | — | — | 1.0 | 36 |
| E. Multiphase Interpolymer ("Cyrolite" G-20 from Cyro Industries | 58 | 4 | 5 | 18 | 15 | | 40 |

[1]ASTM D-1238 Condition I
MMA = methyl methacrylate
EA = ethyl acrylate
BA = butyl acrylate
STY = styrene
BD = butadiene

TABLE II

| | RESISTANCE TO DELAMINATION | | | | |
|---|---|---|---|---|---|
| | | PROPERTIES OF BIAXIALLY-ORIENTED FILM[1] | | | |
| | FILM COMPOSITION (Ref. to Table I) | Specular Transmittance[2] (percent) | Tensile Strength[4] (psi) | Break Elongation (percent)[4] | COVER FILM REMOVAL |
| EXAMPLE NO. | | | | | |
| 1 | 60% A-40% D[3] | 82 | 8,400 | 57 | Excellent-Cannot Peel Off |
| 2 | 80% A-20% D | 85 | 7,300 | 45 | Excellent-Cannot Peel Off |
| 3 | 100% B | 85 | 3,300 | 67 | Excellent-Cannot Peel Off |
| 4 | 100% C | 87 | 6,200 | 10 | Excellent-Cannot Peel Off |
| 5 | 100% D | 85 | — | 50 | Excellent-Cannot Peel Off |
| 6 | 100% E | 40 | 5,300 | 19 | Excellent-Cannot Peel Off |
| Comparative Example | | | | | |
| No. 1 | 100% A | 91 | 10,000 | 7.1 | Fair-Can Peel[5] Film Off At 3 lb/in. |
| No. 2 | 100% C (non-oriented) | 82 | 6,200 | 6.5 | Fair-Can Peel Film |

TABLE II-continued

RESISTANCE TO DELAMINATION

| FILM COMPOSITION (Ref. to Table I) | PROPERTIES OF BIAXIALLY-ORIENTED FILM[1] Specular Transmittance[2] (percent) | Tensile Strength[4] (psi) | Break Elongation (percent)[4] | COVER FILM REMOVAL |
|---|---|---|---|---|
| | | | | Off at 2.4 lb/in. |

[1]Draw Ratio = 2.0; 3 mil thickness
[2]ASTM D1746-70
[3]Blend ratios on weight basis.
[4]Tensile Test @ 0.2"/min crosshead (machine direction).
[5]90° peel of cover film from cured cellular sheeting.

TABLE III

WATER SPRAY TEST

| | COVER FILM (TABLE I) | STRETCH RATIO | TENTER TEMP. | TOP FILM AREA REMOVED (in$^2$) |
|---|---|---|---|---|
| EXAMPLE NO. | | | | |
| 7 | 60% A-40% D | 2.0 | 277° F. | 0.6 |
| 8 | 60% A-40% D | 2.0 | 262° F. | 0.4 |
| 9 | 60% A-40% D | 2.0 | 250° F. | 0.5 |
| 10 | 80% A-20% D | 2.0 | 262° F. | 0.4 |
| 11 | 100% C | 2.0 | 250° F. | 0.3 |
| Comparative Example | | | | |
| No. 3 | 100% C, nonoriented | — | — | 2.25 |
| No. 4 | 100% A | 2.0 | 280° F. | 6.32 |

Following the embossing operation, the samples were cured by placing in an oven set at 150° F. for 17 hours. After cure, samples were checked for delamination resistance. It was not possible to remove anything but small pieces of cover film. A comparative example in which the cover film was polymer A only was also prepared with this binder material and was removable at about 2.5 pounds/inch peel force.

EXAMPLE 13

Example 1 was repeated using the following binder composition:

| | Parts by Weight |
|---|---|
| Terpolymer including 57.5 percent isooctyl acrylate, 35 percent methyl acrylate, and 7.5 percent acrylic acid dissolved in ethylacetate/heptane at 25% solids | 100 |
| Solid epoxy diglycidyl ether of bisphenol A having an epoxide equivalent weight of 500 (Epon 1001, supplied by Shell) | 25 |
| Diglycidyl ether of bisphenol A having an epoxide equivalent weight of 190 (Epon 828, Supplied by Shell) | 10 |
| Rutile Titanium Dioxide Pigment | 20 |
| Stearic Acid | 1 |
| Xylene | 50 |
| N—methyl diethanol amine | 6.9 |

Following the embossing operation, the samples were cured at 140° F. for 70 hours. Samples were then checked for delamination resistance and it was not possible to remove anything but small pieces of the cover film. A comparative example with cover film made with only polymer A was also prepared with this binder material and was removable at about 1.5 pounds/inch peel force.

EXAMPLE 14

Example 1 was repeated except that tripropyleneglycol diacrylate (TPGDA) was substituted for tetraethyleneglycol diacrylate in the binder composition. On testing samples of the prepared sheeting for delamination and vandal resistance using the razor blade test of Example 1, it is found that the cover film is very difficult to separate from the base sheet. Large pieces of film could not be peeled off even when the cover film was supported with "Scotch" Brand carpet tape (available from 3M).

What is claimed is:

1. Retroreflective sheeting comprising (1) a base sheet having a layer of retroreflective elements disposed over one of its surfaces; (2) a polymeric cover film disposed in spaced relation from the layer of retroreflective elements; and (3) a network of narrow intersecting bonds extending between said cover film and base sheet to adhere the cover film and base sheet together and form a plurality of cells within which retroreflective elements are hermetically sealed; characterized in that the cover film comprises a continuous polymeric phase and a discontinuous polymeric phase, the film being biaxially oriented such that the discontinuous polymeric phase is in the form of minute disks distributed uniformly throughout the film.

2. Sheeting of claim 1 in which the cover film comprises a multiphase interpolymer in which the discontinuous phase comprises a first polymeric material and the continuous phase comprises a second more rigid polymeric material polymerized in the presence of the first polymeric material.

3. Sheeting of claim 1 in which the discontinuous phase comprises a polymer having a lower glass transition temperature than the polymer of the continuous phase.

4. Sheeting of claim 1 in which the discontinuous phase comprises a crosslinked polymer.

5. Sheeting of claim 1 in which the discontinuous phase comprises acrylic-based ingredients.

6. Sheeting of claim 1 in which the continuous phase comprises acrylic-based ingredients.

7. Sheeting of claim 1 in which the bonds comprise a crosslinked polymeric material.

8. Sheeting of claim 7 in which the crosslinked polymeric material of the bond is crosslinked by electron-beam radiation.

9. Sheeting of claim 7 in which the crosslinked polymeric material of the bond is crosslinked by thermal curing.

10. Sheeting of claim 1 in which the retroreflective elements are transparent microspheres.

11. Sheeting of claim 1 in which the retroreflective elements are cube-corner retroreflective elements.

12. Sheeting of claim 2 in which the discontinuous phase comprises a crosslinked polymer.

13. Sheeting of claim 2 in which the discontinuous phase comprises acrylic-based ingredients.

14. Sheeting of claim 2 in which the continuous phase comprises acrylic-based ingredients.

15. Sheeting of claim 12 in which the discontinuous phase comprises acrylic-based ingredients.

16. Sheeting of claim 12 in which the continuous phase comprises acrylic-based ingredients.

17. Sheeting of claim 14 in which the discontinuous phase comprises acrylic-based ingredients.

18. Sheeting of claim 16 in which the continuous phase comprises acrylic-based ingredients.

19. Sheeting of claim 1 in which the disks have average diameters less than about 200 nanometers.

20. Retroreflective sheeting comprising (1) a base sheet having a layer of microspheres disposed over one of its surfaces; (2) a cover film disposed in spaced relation from the layer of microspheres; and (3) a network of narrow intersecting bonds extending between said cover film and base sheet to adhere the cover film and base sheet together and form a plurality of cells within which microspheres are hermetically sealed; characterized in that the cover film comprises a multiphase interpolymer comprising a discontinuous crosslinked elastomeric phase and a more rigid thermoplastic continuous phase polymerized in the presence of the elastomeric phase, the elastomeric phase comprising acrylic-based ingredients, and the film being biaxially oriented such that the elastomeric phase is in the form of minute disks distributed uniformly throughout the film.

21. Sheeting of claim 20 in which the thermoplastic phase comprises acrylic-based ingredients.

22. Sheeting of claim 20 in which the elastomeric phase comprises alkyl or aralkyl acrylate, and the thermoplastic phase comprises alkyl or aralkyl methacrylate.

23. Sheeting of claim 20 in which the disks have average diameters less than about 200 nanometers.

* * * * *